Figure 1:
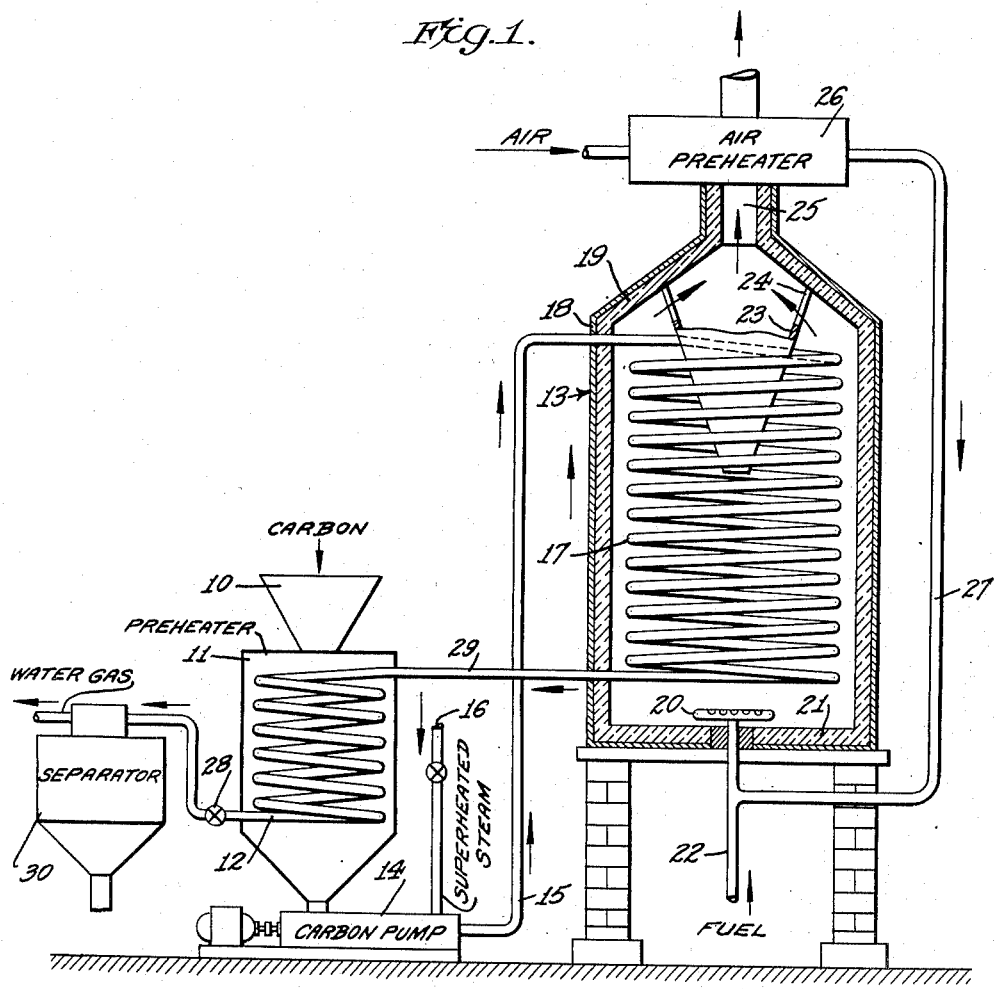

May 15, 1951  C. F. RAMSEYER  2,552,866
MANUFACTURE OF WATER GAS

Filed May 1, 1944  2 Sheets-Sheet 1

INVENTOR:
CHARLES F. RAMSEYER
BY
ATTORNEYS

Patented May 15, 1951

2,552,866

UNITED STATES PATENT OFFICE 2,552,866

MANUFACTURE OF WATER GAS

Charles F. Ramseyer, Old Greenwich, Conn., assignor to H. A. Brassert & Company, New York, N. Y., a corporation of Illinois Application May 1, 1944, Serial No. 533,540

3 Claims. (Cl. 48—78)

This invention relates to the manufacture of water gas and has particular reference to a method and apparatus for the continuous production of water gas from highly reactive, finely-divided carbonaceous materials.

The usual commercial processes of producing water gas are intermittent in operation and require the use of lump coke, which is first blasted to incandescence with air and then blasted with steam to cause the reaction generating the hydrogen-carbon monoxide mixture commonly called water gas. In order to be economical for commercial practice with coke, this reaction must be carried out above 1700–1800° F., because the rate of reaction between hot carbon and water vapor or steam at lower temperatures is too slow and hence too costly. However, if the reaction could be continuously effected at low temperatures without requiring expensive refractory retorts with their maintenance and repair problems, the cost of producing water gas would be materially reduced and the process would be economically feasible.

In accordance with the present invention, a process, and an apparatus for conducting the same, are provided, whereby water gas is economically produced at low temperature with utilization of finely-divided, highly-reactive carbonaceous materials resulting from low temperature carbonization of low rank fuels, such as peat, wood, lignite, or other charrable organic materials, or low grade natural carbonaceous materials. Carbon in the form of ordinary coke is not sufficiently reactive for use in the process.

In carrying out the process of this invention, a stream of the finely-divided carbonaceous material of the type described is reacted with superheated steam in a closed space under substantial superatmospheric pressure of between fifty and five hundred pounds per square inch, and in a relatively low temperature range of 800 to 1600° F., the degree of superatmospheric pressure and the degree of temperature in said range depending upon the carbonaceous material being employed, its fineness, and operating conditions. The very high chemical reactivity of the carbon comprising the finely-divided carbonaceous material described results in a rapid reaction with the steam to form water gas, the reaction taking place in a matter of minutes and, under the most favorable conditions, a matter of seconds.

The foregoing reaction conditions are of such nature that it may be carried out continuously and to that end the apparatus of this invention is provided in the form of a tube, preferably in coil form to conserve space and heat, through which the fluent mixture of the finely-divided carbonaceous material and superheated steam is pumped while under the aforementioned superatmospheric pressure, and the tube is externally heated to the aforementioned temperature. The carbon-steam reaction accordingly takes place in the tube very rapidly and the reaction speed may be increased with commensurately low temperatures by the admixture of a small amount of a suitable catalyst. Also, by proper control of temperature and pressure, the gaseous product may be adjusted to comprise largely hydrogen and carbon dioxide, the latter being readily washed out in case relatively pure hydrogen gas is desired. In any case, the gaseous product is separated from the ash and any unreacted carbon at the conclusion of the operation, the unreacted carbon being recycled or used as powdered fuel.

As a modification of or adjunct to the gas producing process and apparatus of this invention, a similar process and apparatus may be employed to produce the carbonaceous material from finely-divided peat, lignite or wood, as well as a sufficient amount of by-product fuel gas for heating the gas producer. In this supplemental process the raw solid material is charred or carbonized in an externally heated coil, the by-product fuel gas is separated therefrom and the char is directly pumped to the gas reactor for producing the water gas in the manner described.

It will be seen that the present invention provides a very simple process and apparatus for continuously producing water gas and the like from highly-reactive finely-divided carbonaceous materials made of plentiful and inexpensive low rank fuels, at low temperatures under such conditions that the amount of heat required is low, whereby a very economical production of gas is achieved.

Figure 2:
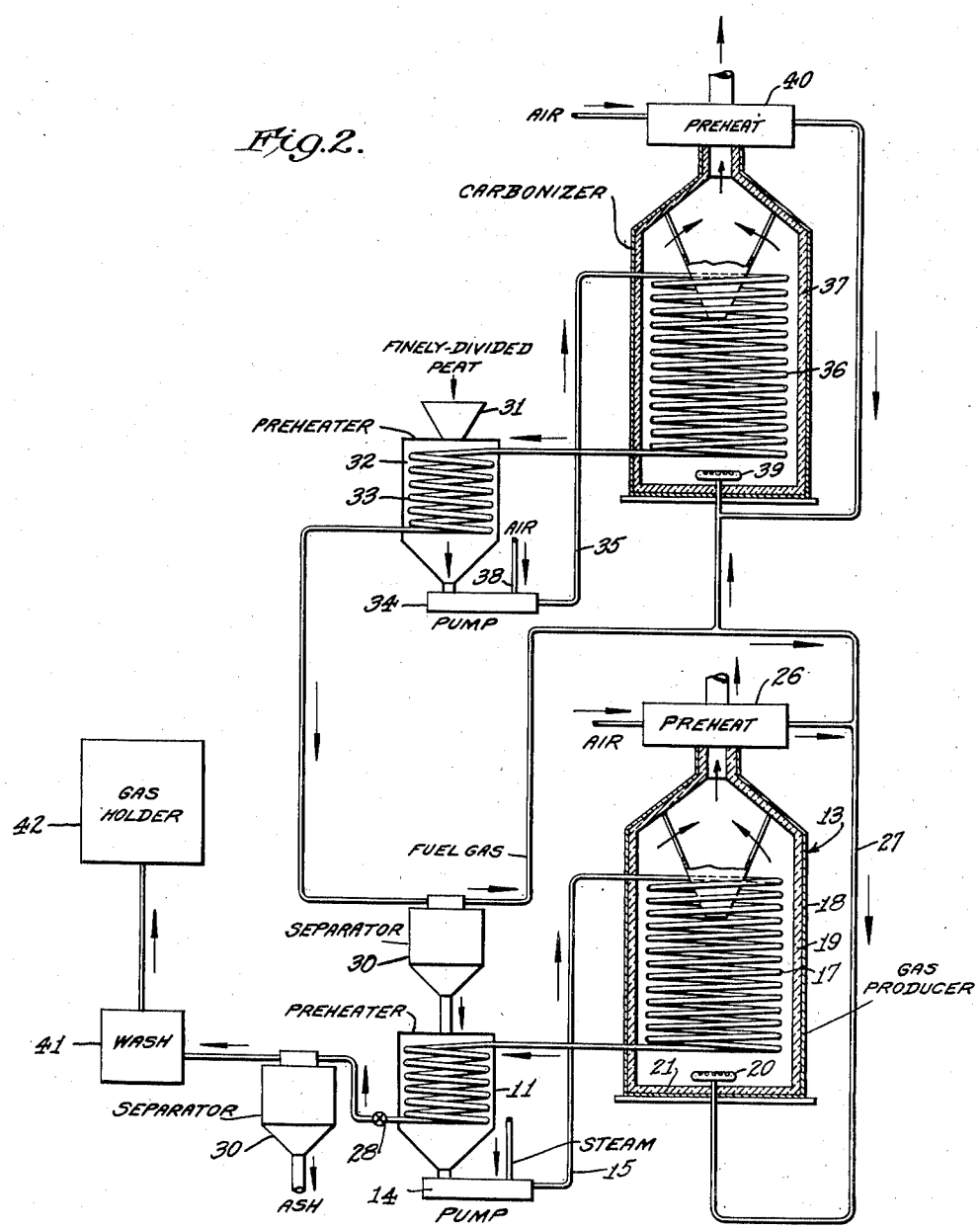

For a more complete understanding of the invention, reference may be had to the accompanying drawings, in which:

Figure 1 illustrates the preferred form of apparatus of this invention for conducting the water gas production according to the process of this invention; and, Fig. 2 is a schematic diagram of the continuous combination carbonization and gas-producing process of this invention.

Referring to Fig. 1 of the drawings, the finely-divided carbonaceous material produced by the pretreatment of low rank fuels, such as peat, lignite, wood, and the like, is supplied to hopper 10, and fed by gravity thereby through a preheater 11 where it is heated by the waste heat in the gas and ash or unreacted carbon flowing through preheater coil 12 from the gas reactor 13, in a manner to be described. The preheated carbonaceous material is then fed by gravity to a pump 14 capable of pumping the finely-divided carbon in admixture with a fluid. A pump of this type is illustrated in Fig. 1 and comprises a casing containing a motor driven screw for advancing the material through and beyond the pump through the tube 15, after the material is mixed with a fluid supplied under pressure by pipe 16. Such pumps are well known in several arts, particularly the cement industry, and one form of such pump is marketed under the name "Fuller-Kinyon."

In adapting this type of pump to the present invention, the preheated carbon, at a pumpable fineness of at least fifty mesh, is pumped through pipe 15. The fluid that is admixed therewith from pipe 16, in order to render the mixture fluent and to react with the carbon, is superheated steam at a pressure of between about fifty and five hundred pounds per square inch, depending upon the carbon fineness and nature, the speed desired for the reaction, the temperature and pressure of the reaction, the tubular material available and the like.

The fluent mixture of carbon and steam flowing through pipe 15 is introduced thereby into the upper end of a spiral tube 17 of the gas reactor 13 for downward spiral flow therethrough. The capacity of the pump 14 is preferably such that a steady stream of the material flows at an average velocity of about thirty feet per second through a four inch diameter tube 15, which is extended to form the spiral 17, which in turn has a spiral diameter of between about ten and twenty feet and a length of eight hundred to two thousand feet, depending upon the several aforementioned variables.

The spiral 17 of gas reactor 13 is enclosed in a suitable steel housing 18 lined with fire brick 19 or other refractory material. The spiral 17 is heated externally by one or more burners 20 positioned above the floor 21 of the gas reactor 13 and preferably supplied with gas as a fuel by pipe 22 from a source to be described. The upper portion of the reactor 13 contains a reflecting cone 23 for radiating the heat in the hot gases laterally and downwardly toward the spiral 17 before the gases flow out of the slots 24 through the stack 25 into the air preheater 26, which is used to preheat the combustion-supporting air supplied to the burner 20 by pipe 27.

During its passage through the spiral 17, the relatively small-diameter stream of carbonaceous material and steam flowing through spiral 17 is heated to a temperature between about 800 and about 1600° F., and the carbon and steam react with each other to form a water gas, which is relatively high in hydrogen and carbon dioxide and contains a relatively small proportion of carbon monoxide. The lower the temperature of reaction the higher the proportion of carbon dioxide that is formed, in accordance with the well-known water gas equilibrium. The more carbon dioxide there is formed, the less endothermic the reaction becomes, thus making it possible to economically carry out the reaction as a continuous process. Thus by utilizing a low temperature range the endothermic reaction is commensurately brought down within a range where the heat increase for the reaction can be reasonably supplied by transmission through the walls of heated pipes in sufficient quantity.

In order to provide additional steam for contact with the char, the reaction may be conducted under super-atmospheric pressure, which to a degree serves in lieu of added heat to speed up the reaction. To that end a throttling valve 28, preferably placed after the carbon preheating coil 12, to which spiral 17 is connected by pipe 29, is provided to maintain a static super-atmospheric pressure within spiral 17 of from fifty to five hundred pounds per square inch, depending upon requirements. Furthermore, a catalyst, such as nickel, iron, or cobalt oxide particles or sponge, or the like, may be mixed with the carbon to aid the reaction at a low temperature, the catalyst being recovered and reused. Alternatively, a char containing ash having catalytic properties may be employed.

In any event, if the carbon dioxide content in the gas so produced is to be reduced in proportion to the hydrogen and carbon monoxide, it may be readily washed out with water after compression, or with an amine at normal pressure, according to known methods. In fact, in cases where relatively pure hydrogen is desired, the reaction temperature in the spiral 17 may be kept so low as to result in formation of a gas consisting primarily of hydrogen and carbon dioxide with very little carbon monoxide content, and then the carbon dioxide content is washed out in the manner described, leaving the desired hydrogen.

As aforementioned, the hot products of the reaction in spiral 17 are supplied by pipe 29 to the coil 12 of the carbon preheater 11 for heat transfer with the carbon. After its pressure is reduced at throttle valve 28, the water gas is separated from the solids in a cyclone separator 30, and the gas is used for combustion, reduction or other purpose, or stored, after being washed to remove dust or carbon dioxide as desired.

Depending upon the purity of the primary carbon used and the completeness of the reaction, the solid residue from the separator 30 may be largely or entirely ash. However, any unreacted carbon may be recovered and recycled by being mixed with make-up carbon before changing to hopper 10. The unreacted carbon, or the carbon which it is uneconomical to react further may be recovered from the ash and used to heat the gas reactor 13 instead of gas or in addition thereto, or preferably it may be used to generate the steam supplied by pipe 16 to pump 14.

Although the reaction carbon may be produced from the peat, lignite, wood, or the like, by any known carbonization method, it is preferred that it be conducted simultaneously with the gas production, as shown in Fig. 2.

The schematic diagram of Fig. 2 adds to the gas-producing system of Fig. 1, a system for continuously carbonizing the peat, wood, or other organic or charrable materials, for feeding at the desired rate directly into the gas producing system, with commensurate economy of operation because of heat conservation and fuel gas supply incidental to the operation of the carbonizing process. Assuming that peat or "saw-dust" is the raw material desired for use, it is supplied in finely-divided form to hopper 31 of a carbonizing system similar to the gas-making system shown in Fig. 1. The finely-shredded peat or fine saw-dust is preheated at 32 by the residual heat in the carbonization products flowing through coil 33, and is then pumped by pump 34 to tube 35 and spiral 36 of carbonizer 37 after being admixed with fluidizing air, steam, flue gas or the like, by pipe 38. If steam is used the temperature in the carbonizer is low enough so that carbonization with little water gas reaction results, and the by-product gas is a mixture of coal gas, water gas and non-combustibles.

Carbonizer 36 is heated by burner 39 and is constructed like the gas producer 13 in Fig. 1. The peat in the spiral 36 is heated to carbonizing temperatures on the order of 1200 to 1600° F., and the resulting carbon separated from the combustible by-product gas in separator 30 and supplied to the gas-producing system which is constructed and operated like that shown in Fig. 1, so that further description is not necessary.

The by-product fuel gas from the carbonization operation is supplied to the burner 39 of the carbonizer 37 and to the burner 20 of the gas reactor 13, and combustion at carbonizer burner 39 is sustained by air preheated by the carbonizer flue-gas at preheater 40, just as air for the gas reactor burner 20 is preheated by flue-gas at preheater 26. It will be observed that the carbon supplied to preheater 11 from separator 37 is already somewhat preheated from the carbonizing process. Also, as previously mentioned, the water gas from producer 13 may be washed free of dust or carbon dioxide or both in a washer 41 before being supplied to storage 42 or place of use.

Although certain preferred embodiments of the invention have been illustrated and described herein, it is to be understood that the invention is not limited thereby, but is susceptible of changes in form and detail within the scope of the appended claims.

I claim:

1. A continuous low pressure process of making water gas and the like which consists in heating finely-divided carbonaceous material of the class consisting of peat, lignite and wood, in the presence of oxygen to char the carbonaceous material, pumping a stream of said charred carbonaceous material at about 30 feet per second, injecting superheated steam under superatmospheric pressure of 50 to 500 pounds per square inch into said material to suspend said material in said steam and thereby render the same fluent, externally heating about 800 to 2,000 feet of said stream to a temperature between 800° and 1600° F. and throttling said stream to maintain it under a static pressure of 50 to 500 pounds per square inch.

2. In an apparatus for continuously producing water gas from charrable materials, the combination of an elongated coiled conduit, a pump connected to one end thereof, a first hopper for supplying finely-divided carbonaceous material to said pump for pumping through said conduit, a heat exchanging coil in said hopper, a burner for heating said conduit externally to cause the carbonaceous material flowing through said conduit to char, means connecting said first conduit to said heat exchanging coil for flow of said charred carbonaceous material therethrough to preheat the carbonaceous material in said hopper, a second hopper for receiving the charred material from said coil, a second coiled conduit, a second pump having an inlet connected to said hopper and an outlet connected to said second coiled conduit for delivering said charred material from said second hopper to the inlet end of said second conduit, means for supplying steam to said second conduit adjacent to said pump for mixture with the charred material pumped therethrough, a second burner for heating said second conduit externally, a separator connected to the outlet end of said second conduit for separating gases from the solid residue of the reaction, a throttling valve interposed between said second conduit and said separator, and a second heat exchanging coil in said second hopper and connected between the outlet of said second conduit and said throttling valve in heat exchanging relation to the charred material in said second hopper for heating said charred material prior to its entry into said second pump.

3. In an apparatus for continuously producing water gas from charrable materials, the combination of a first elongated coiled conduit, a pump connected to one end thereof, a hopper for supplying finely-divided carbonaceous material to said pump for pumping through said conduit, a burner for heating said conduit externally to cause the carbonaceous material flowing through said conduit to char and to produce a fuel gas, a heat exchanging coil in said hopper connected to the discharge end of said coiled conduit to preheat the carbonaceous material in said hopper, a second coiled conduit, a second pump connected between said heat exchanging coil and said second conduit for pumping said charred material through said second conduit, means for supplying superheated steam to said second conduit for mixture with the charred material pumped therethrough, a burner for heating said second conduit externally to cause the charred material and steam to form water gas, a separator connected to the other end of said second conduit for separating the gas from the solid residue of the reaction, a throttling valve in said second conduit upstream of said separator for maintaining a superatmospheric pressure in said second conduit, a preheating coil connected to said second conduit between the latter and said throttling valve and in heat exchanging relation to the charred material entering said second pump for heating said charred material prior to its entry into said second pump, and means for supplying fuel gas produced in said first conduit to both of said burners.

CHARLES F. RAMSEYER.

REFERENCES CITED

The following references are of record in the file of this patent:

UNITED STATES PATENTS

| Number | Name | Date |
|---|---|---|
| 795,874 | Whitfield | Aug. 1, 1905 |
| 956,371 | Koppers | Apr. 26, 1910 |
| 1,901,170 | Karrick | Mar. 14, 1933 |
| 2,276,343 | Reyerson et al. | Mar. 17, 1942 |

FOREIGN PATENTS

| Number | Country | Date |
|---|---|---|
| 363,931 | Great Britain | Dec. 31, 1931 |

OTHER REFERENCES

Morgan, "American Gas Practise," pp. 74–75.